(12) United States Patent
Gretz

(10) Patent No.: US 6,521,831 B1
(45) Date of Patent: *Feb. 18, 2003

(54) DUPLEX ELECTRICAL CONNECTOR WITH SPRING STEEL CABLE RETAINER

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/941,341

(22) Filed: Aug. 29, 2001

Related U.S. Application Data

(63) Continuation-in-part of application No. 09/792,185, filed on Feb. 23, 2001, now Pat. No. 6,355,884, which is a continuation-in-part of application No. 09/373,427, filed on Aug. 13, 1999, now Pat. No. 6,194,661.

(51) Int. Cl.[7] ................................................. H02G 3/18
(52) U.S. Cl. .................. 174/65 R; 439/552; 174/153 R
(58) Field of Search ........................... 174/65 R, 153 R, 174/59, 60, 61, 62, 151, 65 G, 153 G; 439/552

(56) References Cited

U.S. PATENT DOCUMENTS 5,373,106 A * 12/1994 O'Neil et al. ............. 174/65 R
6,080,933 A *  6/2000 Gretz ....................... 174/65 R

* cited by examiner

Primary Examiner—Javaid Nasri

(57) ABSTRACT

A duplex electrical connector providing two inbound end apertures to conduct two helically wound armored or metal clad electrical cables through a single hole in an electrical junction box and secure it thereto. The duplex connector includes a housing with spring steel cable retainers at its inbound end to secure the cables and prevent their forceful withdrawal from the box. A spring steel adapter is included at the outbound end of the housing to provide easy snap-in attachment to the box. Two embodiments include an insert for attaching the cable retainers to the housing and a third embodiment includes a housing that accepts the cable retainers without the need for a separate insert.

6 Claims, 5 Drawing Sheets

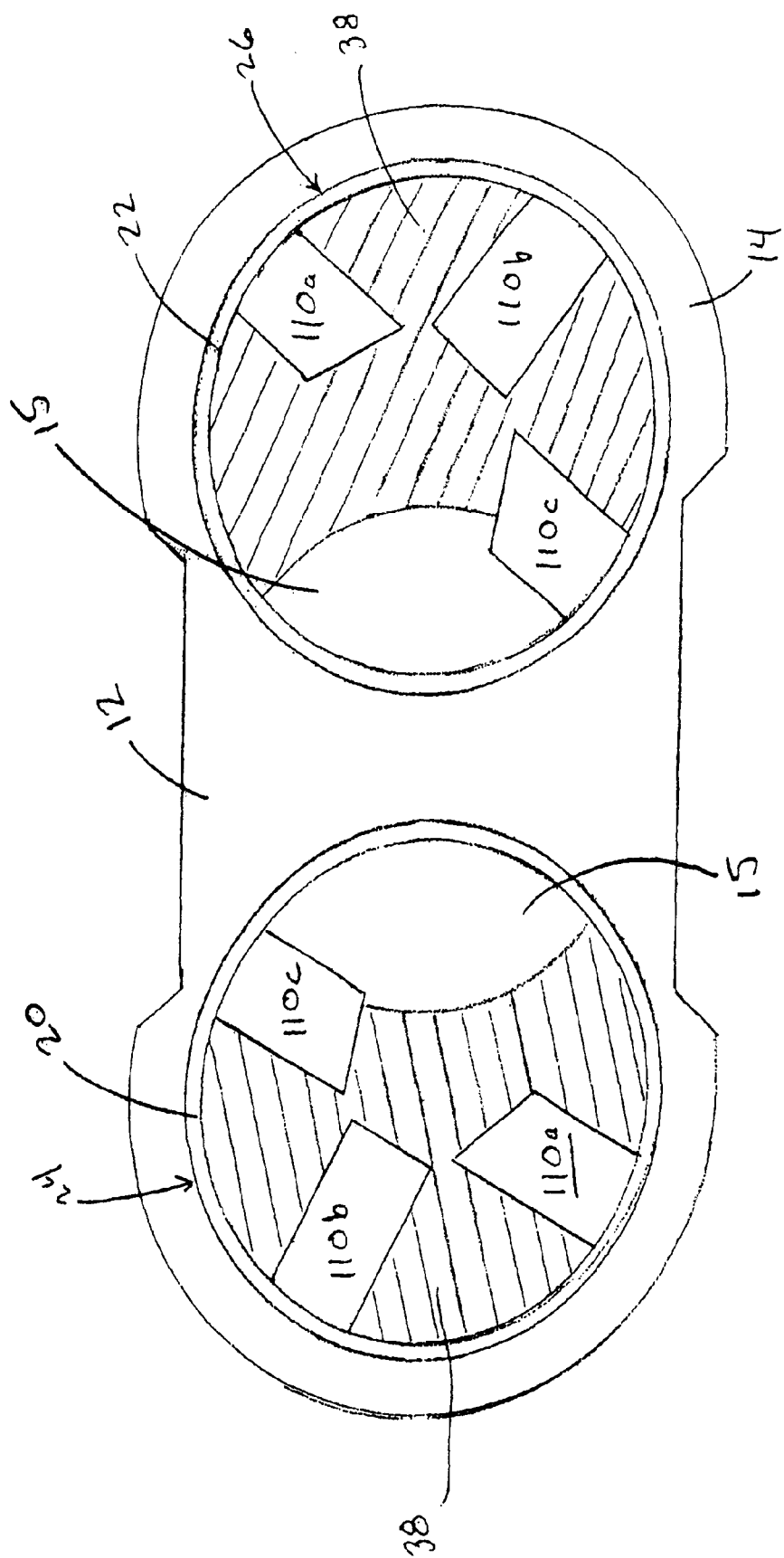

DUPLEX ELECTRICAL CONNECTOR WITH SPRING STEEL CABLE RETAINER

This application is a Continuation-In-Part of U.S. Patent Application entitled "Duplex Connector" filed Feb. 23, 2001, application Ser. No. 09/792,185 now U.S. Pat No. 6,355,884 which is a Continuation-In-Part of U.S. Patent Application entitled "Duplex Connector" filed Aug. 13, 1999, application Ser. No. 09/373,427 now U.S. Pat. No. 6,194,661.

FIELD OF THE INVENTION

The present invention relates to cable terminations and more particularly to duplex or two-wire cable terminations that snap into place and include snap-on cable retainers, neither of which requires twisting for locking.

BACKGROUND OF THE INVENTION

U.S. Pat. No. 6,080,933 issued Jun. 27, 2000 in the name of Thomas J. Gretz for "Snap in Cable Connector", and herein incorporated by reference in its entirety, describes a locking cable connector composed of three mating pieces that snap together and provide a connector for connecting helically wound armored or metal clad electrical conductors to junction boxes or electrical panels. The first piece of the snap in locking cable connector is a die cast member including at its inner end a smooth outer cylindrical section having an outer diameter with flanges that accommodates a second piece comprising a spring steel adapter. The spring steel adapter is used to secure the connector to a junction box. The third piece is a spring steel locking ring provided to receive a helically wound shielded cable that is inserted into the outer end of the die cast member. The locking ring has outwardly directed tangs that snap into the die cast member and secure it thereto. The locking ring also has inwardly directed tangs to receive the armored cable through its inner bore and restrict its removal by a rearward applied force. The part named "spring steel locking ring" of U.S. Pat. No. 6,080,933 is hereinafter referred to as "spring steel cable retainer" in this disclosure.

U.S. Pat. No. 6,194,661 issued Feb. 27, 2001 in the name of Thomas J. Gretz for "Duplex Connector", and herein incorporated by reference in its entirety, discloses a duplex connector that combines the spring steel locking ring and spring steel adapter of U.S. Pat. No. 6,080,933 with a novel connector to connect two helically wound armored or metal clad electrical conductors to a junction box or an electrical panel through a single access hole or knockout. The duplex connector includes a housing having a generally oval or race track-shaped inbound end and a cylindrical outbound end. The inbound end of the housing is adapted to accept an insert containing two spring steel cable retainers that are analogous to the spring steel locking rings of U.S. Pat. No. '933 with the outbound end adapted to accept a spring steel adapter analogous to the spring steel adapter of U.S. Pat. No. '933. The insert is secured to the housing in U.S. Pat. No. '661 by a screw or similar fastening device.

Although the duplex connector of U.S. Pat. No. '661 provides an easy way to connect two conductors through a single access hole in a junction box or panel, it can be improved. A simpler design of the duplex connector of '661 could be created by removing the outward tangs on the cable retainers and replacing the apertures on the insert with a threaded hole sized to accept a set screw. Set screws could then be inserted to secure the spring steel cable retainers to the insert. Another simpler design of both the spring steel cable retainers and the insert would be achieved by forming annular ridges at the inboard end of the insert to hold the cable retainers inside the insert. In this manner the outward tangs on the cable retainers could be eliminated along with the tang apertures on the insert.

The duplex connector of the present invention could be made even simpler by modifying the inbound end of the connector housing to hold the cable retainers. Modified in this manner, the insert could be eliminated thereby reducing the number of required parts.

SUMMARY OF THE INVENTION

The present invention provides several simplified designs of the duplex connector disclosed in U.S. Pat. No. 6,194,661 issued Feb. 27, 2001 to Gretz. U.S. Pat. '661 discloses a duplex connector that combines the spring steel locking ring and spring steel adapter of U.S. Pat. 6,080,933 with a novel connector to connect two helically wound armored or metal clad electrical conductors to a junction box or an electrical panel. The duplex connector includes an insert that is fastened to its inbound end and includes spring steel cable retainers to secure two inbound cables.

A first embodiment of the present invention simplifies the design of the duplex connector of U.S. Pat. No. '661 by removing the outward tangs on the cable retainers and replacing the apertures on the insert with a threaded hole sized to accept a set screw. Set screws are then inserted to secure the spring steel cable retainers to the insert. In this manner the machining of the spring steel cable retainers are simplified by eliminating the requirement to form outwardly extending tangs. Machining of the insert is also simplified by eliminating the apertures to accept the tangs of the cable retainers.

A second embodiment of the duplex connector simplifies the connector even further by providing annular ridges at the inbound end of the insert to act as a retainer for holding the spring steel cable retainers. The cable retainers are then simply snapped into place within the inbound end of the insert thereby eliminating the need for tangs or set screws to hold them in place.

A third and preferred embodiment simplifies the duplex connector of U.S. Pat. No. '661 even further by eliminating the need for an insert. In this embodiment, the inbound end of the connector housing is modified to accept the spring steel cable retainers without the need for an insert. This greatly simplifies the construction of the duplex connector by completely eliminating the need for a separate part.

Another simpler design of both the spring steel cable retainers and the insert would be achieved by forming annular ridges at the inboard end of the insert to hold the cable retainers inside the insert. In this manner the outward tangs on the cable retainers could be eliminated along with the tang apertures on the insert.

DESCRIPTION OF THE DRAWINGS

FIG. 6 is an end view of the inbound end of the housing of the preferred embodiment of FIG. 3.

Table of Nomenclature

Figure 1:
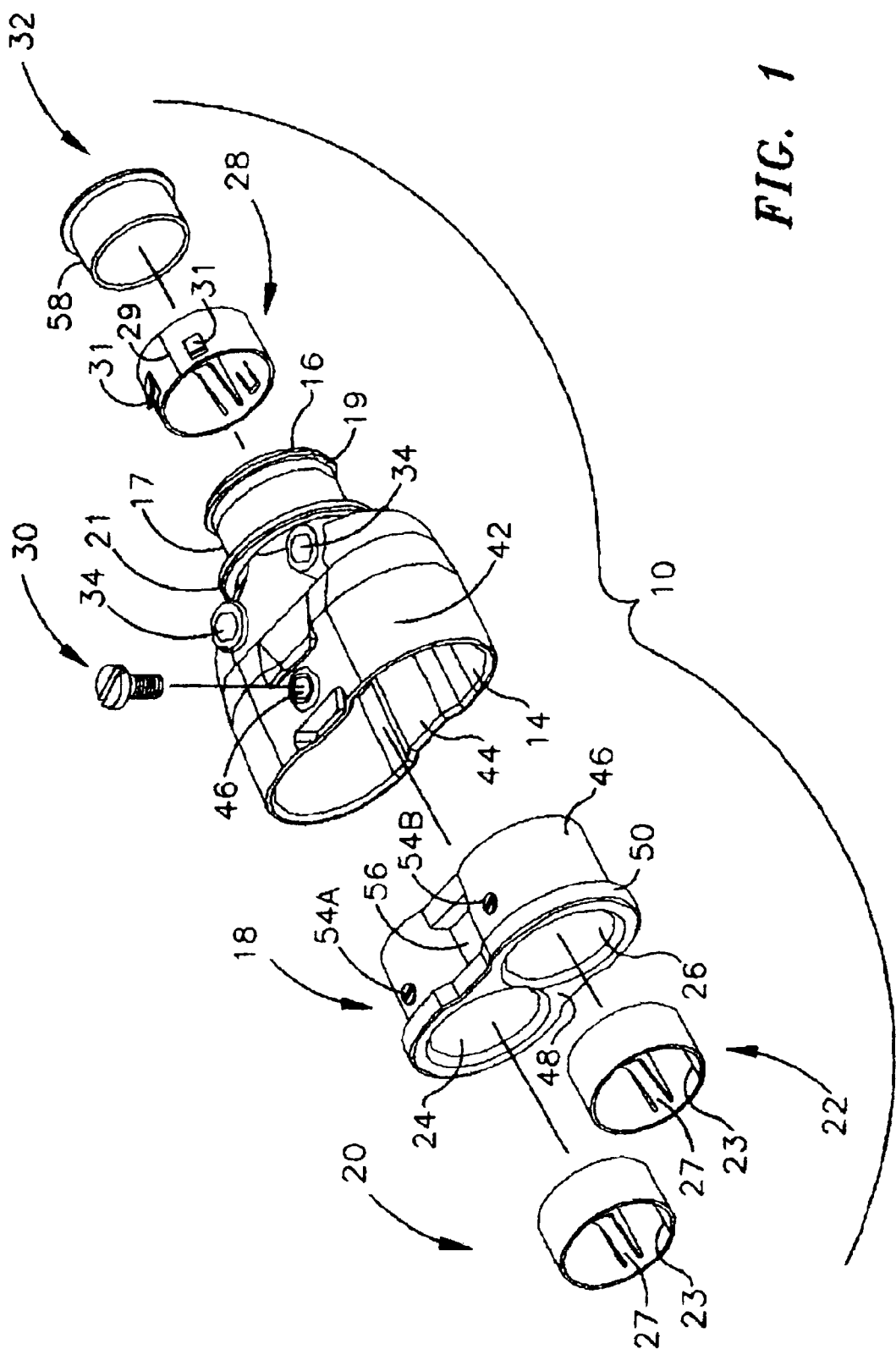
FIG. 1 is a blown apart view of a first embodiment of the duplex connector of the present invention in which tangs and tang apertures are eliminated from the cable retainers and insert respectively.

| Part No. | Part Description |
|---|---|
| 10 | duplex connector |
| 12 | housing |
| 14 | inbound end (of housing 12) |
| 15 | aperture in outbound end of housing |
| 16 | outbound end (of housing 12) |
| 17 | outer diameter (of outbound end of housing) |
| 18 | inbound end insert |
| 19 | flange (of outbound end of housing) |
| 20 | spring steel cable retainer |
| 21 | flange (of inner portion of outbound end of housing) |
| 22 | spring steel cable retainer |
| 23 | slots (in cable retainers 20, 22) |
| 24 | inbound insert aperture |
| 25a | annular ridge |
| 25b | annular ridge |
| 26 | inbound insert aperture |
| 27 | inward cable-gripping tangs (in cable retainers) |
| 28 | spring steel adapter |
| 29 | slot (in spring steel adaptor) |
| 30 | locking screw (to secure inbound end insert) |
| 31 | tangs (on outer circumference of adapter 28) |
| 32 | bushing |
| 34 | peepholes |
| 36 | shoulder portions (of housing) |
| 38 | interior surface (of shoulder portions) |
| 40 | internal volume (of housing) |
| 42 | top wall |
| 44 | bottom wall |
| 46 | insertion end (of insert 18) |
| 47 | threaded hole (for screw 30) |
| 48 | end (of insert 18) |
| 50 | flange (of insert 18) |
| 52A | outward projecting tang (of cable retainer) |
| 52B | outward projecting tang (of cable retainer) |
| 54A | tang aperture (for tang 52a) |
| 54B | tang aperture (for tang 52b) |
| 56A | outward projecting tang (of cable retainer) |
| 56B | outward projecting tang (of cable retainer) |
| 57A | tang aperture (for tang 56A) |
| 57B | tang aperture (for tang 56B) |
| 58 | cylindrical body (of bushing) |
| 60 | flange (of bushing) |
| 70 | flange (of housing) |
| 80 | panel |
| 81 | viewing window |
| 82 | projections (from panel) |
| 108 | aperture (in cable retainer) |
| 110a | inwardly extending tang (of cable retainer) |
| 110b | inwardly extending tang (of cable retainer) |
| 110c | inwardly extending tang (of cable retainer) |
| 118 | gap (of cable retainer) |
| 124 | forward edge (of cable retainer) |
| 126 | trailing edge (of cable retainer) |

DETAILED DESCRIPTION OF THE INVENTION

Figure 2:
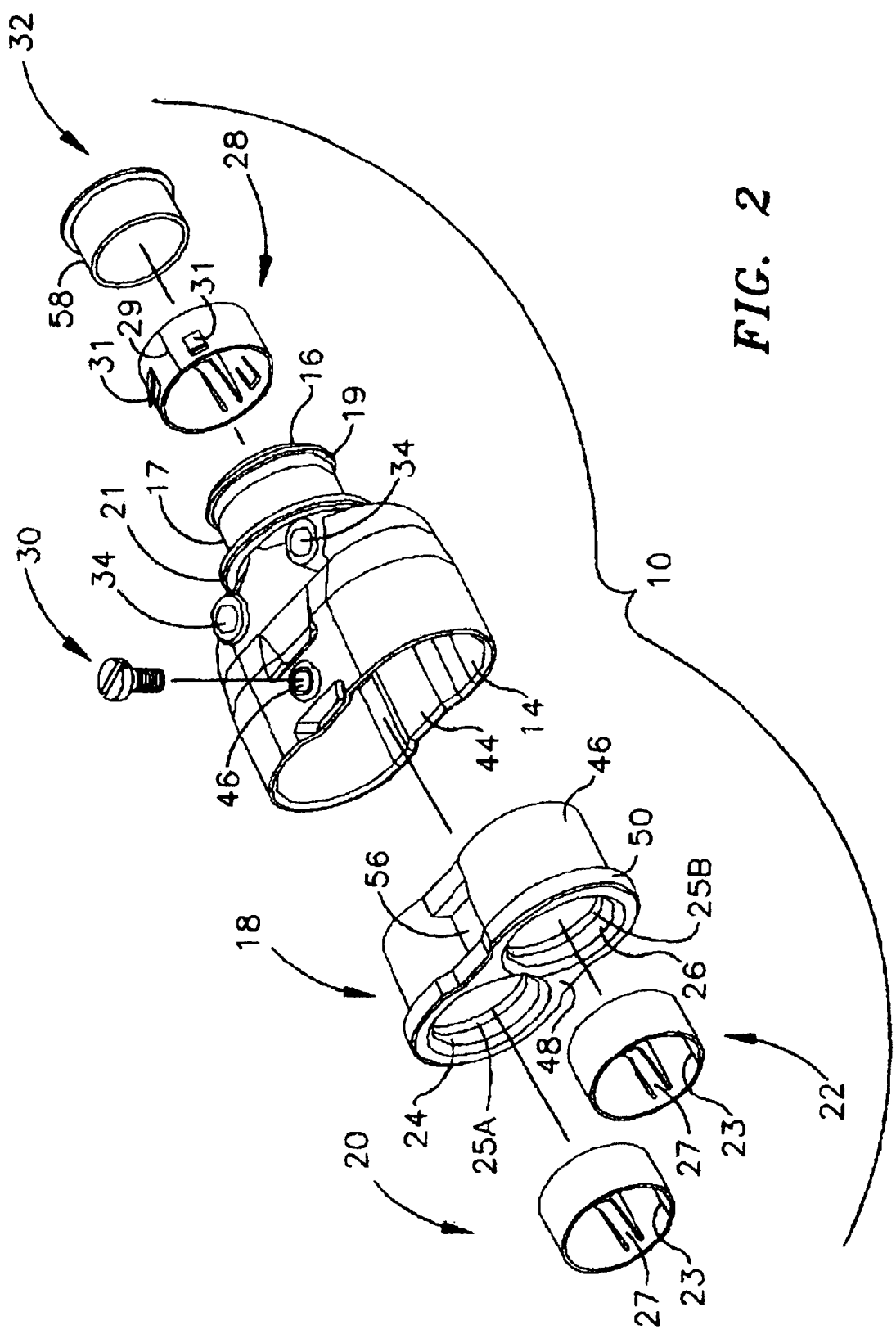
FIG. 2 is a blown apart view of a second embodiment of the duplex connector of the present invention in which cable retainers are held in the insert by annular ridges.

As shown in FIG. 1 and FIG. 2, the duplex connector 10 of the first two embodiments of the present invention comprises many of the same components as the duplex connector of U.S. Pat. No. 6,194,661 including a housing 12 having a generally oval or race track-shaped inbound end 14 and a cylindrical outbound end 16, an inbound end insert 18, spring steel cable retainers 20 and 22 that insert into a pair of parellel apertures or openings 24 and 26 in the inbound end, spring steel adapter 28 about the outer diameter 17 of cylindrical outbound end 16 and retained by flanges 19 and 21, locking screw 30, a bushing 32 inserted into the inner circumference of outbound end 16 and a pair of peepholes 34 that permit viewing of the interior of housing 12 to determine the presence and/or location of cable inserted into housing 12 through insert apertures 24 and 26.

Housing 12, in addition to previously described generally oval inbound end 14, peepholes 34, and cylindrical outbound end 16 incorporating outer diameter 17 and flanges 19 and 21 includes shoulder portions 36 whose interior surfaces 38 are smooth to guide cables inserted through inbound end 14 via insert apertures 24 and 26 toward and through internal volume 40 of cylindrical outbound end 16. Additionally, housing 12 includes, in at least one of its relatively flat top or bottom walls 42 and 44, a threaded hole 47 for rotational engagement of screw 30 as described hereinafter. Flange 19 has a slight inward incline to ease insertion of housing 12 into a junction box aperture and to ease the application of spring steel adapter over outer diameter 17. Flange 21 is of a greater diameter than flange 19 to prevent over insertion of spring steel adapter 28.

In the first two embodiments of the duplex connector shown in FIGS. 1 and 2, insert 18 comprises a binocular shape and has outer dimensions at insertion end 46 that are matched to the inner dimensions of generally oval inbound end 14 of housing 12. End 48 of insert 18 includes a flange 50 about both insert apertures 24 and 26 that serves as a stop to limit insertion of insert 18 into inbound end 14 of housing 12.

Referring to FIG. 1, the first embodiment of the duplex connector 10 of the present invention includes the spring steel cable retainers 20, 22 aligned with the central axis of each of their respective inbound insert apertures 24, 26. The cable retainers 20, 22 are each discontinuous at slots 23. When inserted into insert 18, the cable retainers 20, 22 are compressed until slots 23 become essentially closed and allow them to be inserted into their respective insert aperture 24, 26. A plurality of inwardly directed tangs 27, one of which is in view in FIG. 1 on each cable retainer 20, 22, are oriented toward the insert 18 and extend into the central core of the retainers 20, 22. The cable retainers 20, 22, after being compressed and inserted into their respective insert apertures 24, 26, snap outwardly and are held in the insert 18 by tightening of the respective set screws 55A, 55B. The first embodiment of the present invention thereby reduces the amount of machining required by eliminating the need to form outward tangs in the cable retainers 20, 22 and tang accepting apertures in the insert 18.

As shown in FIG. 1, a bushing 32 comprising a cylindrical body 58 having a flange 60 is inserted at the outbound end 16 of the housing 12 to prevent accidental damage to inserted cable (not shown in FIG. 1). Bushing 32 is designed to frictionally engage the interior of cylindrical outbound end 16 of housing 12 and is preferably made of a polymeric material that serves to cushion cable inserted into housing 12 and exiting through cylindrical outbound end 16.

As shown in FIG. 1, spring steel adapter 28 includes a slot 29 to permit expansion prior to being fitted over diameter 17, and includes a plurality of tangs 31 to prevent removal of adapter 28 from the aperture of a junction box (not shown) after installation into such an aperture. A more detailed description of adapter 28 and its operation can be found in U.S. Pat. No. 6,080,933 entitled "Snap In Cable Connector", assigned to the same assignee as the present invention and incorporated herein by reference.

Referring to FIG. 2, the second embodiment of the duplex connector 10 is a simplified design that eliminates the need for tangs or set screws to secure the spring steel cable retainers 20, 22 to the insert 18. In this embodiment, the cable retainers 20, 22 are held in place by annular ridges 25A, 25B in each respective inbound insert aperture 24, 26. To insert the cable retainers 20, 22 in the insert apertures 24, 26, the discontinuous cable retainers 20, 22 are each compressed until each slot 23 is minimized. The compressed cable retainers 20, 22 are then slipped past the annular ridges 25A, 25B into the insert apertures 24, 26 and then allowed to relax to their unbiased shape. The cable retainers 20, 22 therefore snap outwardly to their larger unbiased diameters and are held in the insert 18 by their respective annular ridges 25A, 25B. Peepholes 34 are provided in the top wall 42 of the insert 18 to assist in viewing the wiring after it is installed inside the connector 10. The second embodiment of the present invention thereby reduces the amount of machining required by eliminating the need to form outward tangs, tang accepting apertures, or set screws to hold the cable retainers 20, 22 in place.

Figure 3:
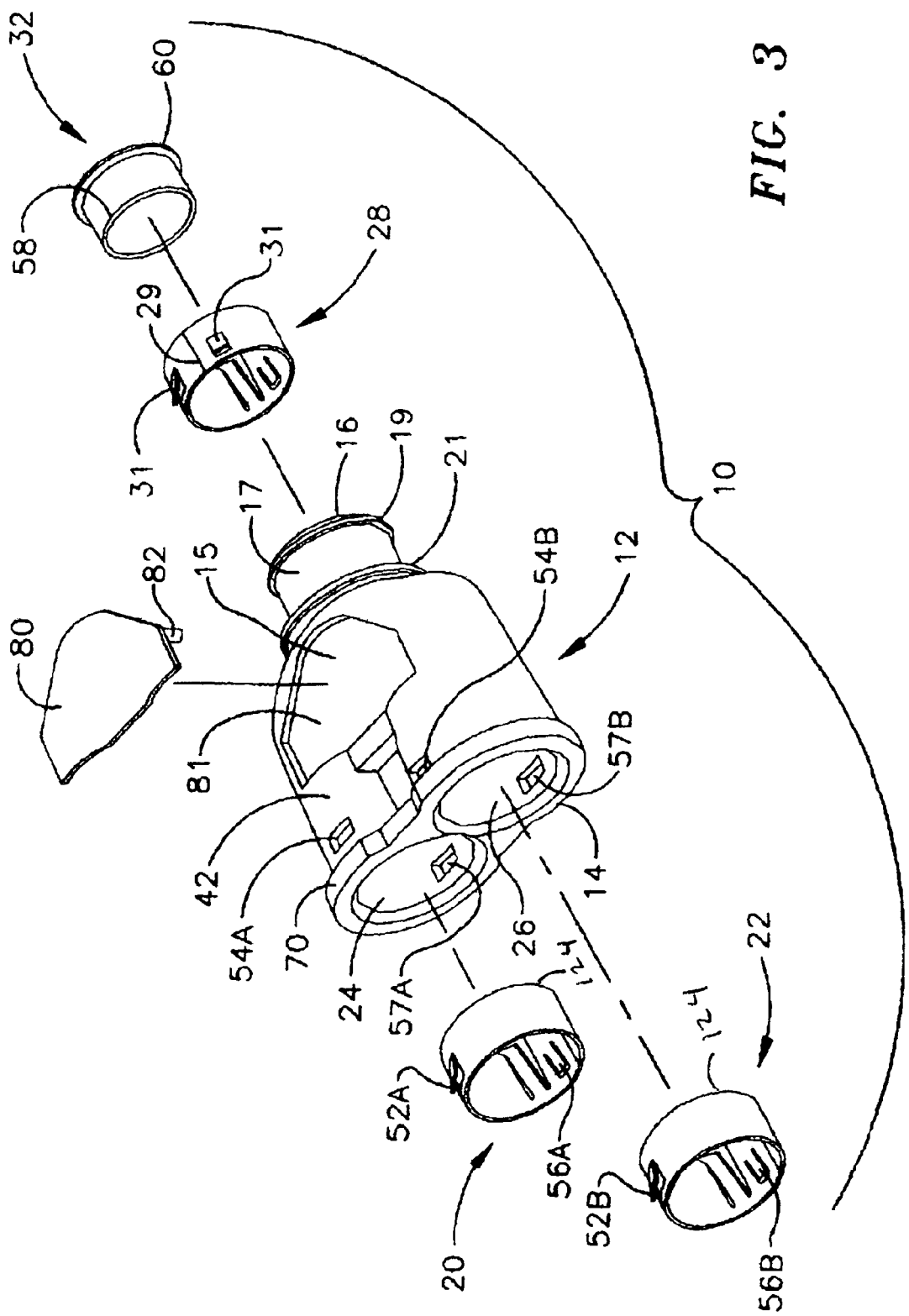
FIG. 3 is a blown apart view of a third and preferred embodiment of the duplex connector of the present invention in which the insert is eliminated.

A blown apart view of the third and preferred embodiment of the duplex connector 10 is depicted in FIG. 3. The insert, as shown in FIG. 3, has been eliminated and its functionality has been built into the housing 12. In the duplex connector of U.S. Pat. No. 6,194,661, tang accepting apertures were formed in the insert. In the present embodiment of the duplex connector 10, the tang accepting apertures 54A, 54B, 57A, 57B are formed in the inbound end 14 of the housing 12. As cable retainer 20 is compressed, inserted into inbound insert aperture 24 and then released, outward extending tang 52A snaps into tang aperture 54A and outward extending tang 56A snaps into tang aperture 57A. Cable retainer 22 is held in a similar manner by tangs 52B and 56B and tang apertures 54B and 57B. This preferred embodiment of the duplex connector 10 thereby simplifies the design of the connector even further by eliminating the need for a separate insert and housing and including the functionality of the insert in the housing. The inbound end 14 of the housing includes a flange 70 that adds structural rigidity to the housing.

The preferred embodiment of the duplex connector shown in FIG. 3 also has an advantage of a larger viewing area for internal connections. A viewing window 81 is provided in the top wall 42 of the housing 12. A snap-fit panel 80 is provided with the duplex connector 10 and snapped into place in the viewing window 81. Projections 82 on the panel provide a means for panel 80 to snap fit into the viewing window 81. The panel 80 may later be removed if desired for later viewing the cables within the connector 10.

Figure 4:
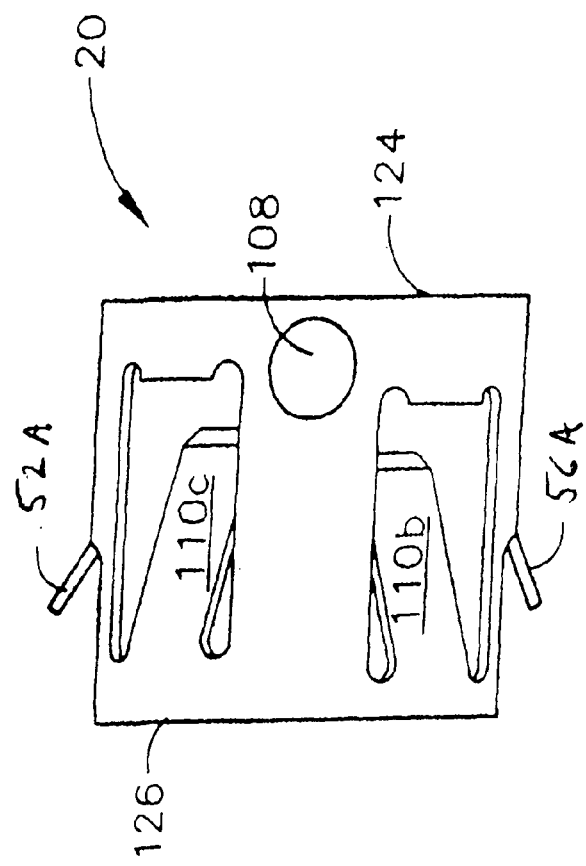
FIG. 4 is a side view of spring steel cable retainer 20 or 22 of FIG. 3.

FIG. 4 is a side view of the spring steel cable retainer 20 or 22 of FIG. 3. The cable retainer 20 is depicted with a forward edge 124 and a trailing edge 126. When inserted into the housing, as shown in FIG. 3, forward edge 124 will slide into inbound insert aperture 24. Referring again to FIG. 4, cable retainer 20 includes outward projecting tangs 52A and 56A and two of the inward projecting cable tangs 110a and 110c at staggered distances from forward edge 124. Although aperture 108 is depicted, it is not functional in the present invention but is used to hold the blank during the manufacturing process when the spring steel blank (not shown in FIG. 4) is formed into the tubular spring steel 20 cable retainers 20 and 22.

Figure 5:
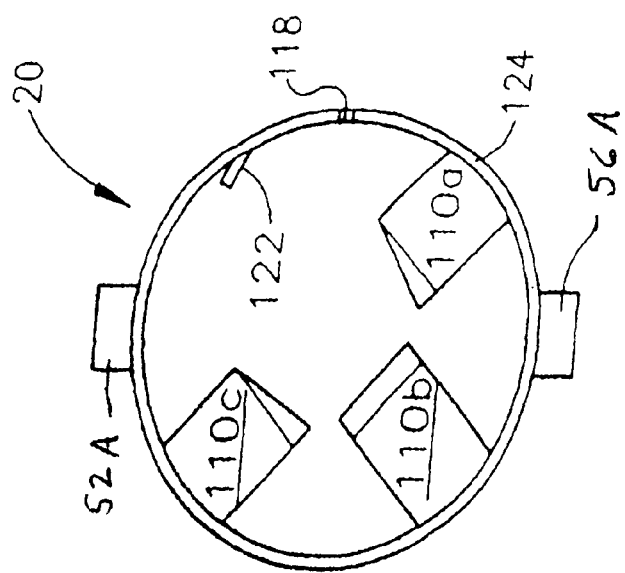
FIG. 5 is an end of spring steel retainer 20 or 22 as viewed from forward edge 124 of the retainer shown in FIG. 4.

FIG. 5 is an end view of spring steel retainer 20 or 24 as viewed from forward edge 124 showing staggered cable tangs 110A, 110B and 110C oriented toward forward edge 124. Outward projecting tangs 52A, 56A are oriented toward the trailing edge (not shown in FIG. 5). The purpose of triangle-shaped gripper 122 is to secure the cable retainer during the manufacturing process and is not functional to the operation of the retainer in the present invention. During its manufacture, cable retainer 20 is formed from a flat blank and is therefore not continuous, as shown in FIG. 5, with a gap 118 existing between the two ends of the blank that has been formed into a circular shape.

Referring to FIGS. 4 and 5, the spring steel cable retainer 20 is adapted to receive a helically wound shielded cable (not shown in FIGS. 4 and 5) when inserted from trailing edge 126 toward forward edge 124. The inwardly extending tangs 110a, 110b, 110c are staggered at distances from trailing edge 126 that permit them to find and seat in the existing grooves in the helically wound shielded cable. Once the cable is inserted fully in the cable retainer 20, past all the inwardly extending tangs 110a, 110b, 110c, the cable retainer 20 will resist removal of the cable by any rearward force applied to it. The cable retainer 20 is shown in FIGS. 4 and 5 prior to its insertion in the inbound insert aperture 24 of the present invention to aid in describing its function in the present invention. The reader should realize that the cable retainer 20 will function best to grip the cable when secured in the inbound insert aperture of the housing or insert described previously. When later secured in the inbound insert aperture, the gap 118 shown in FIG. 5 will be minimal and the outward expansion of the cable retainer 20 will be constrained by the cylindrical walls of the inbound insert aperture.

As shown in FIG. 5, the inwardly extending cable tangs 110a, 110b, 110c are oriented as shown, about 90° apart. The orientation of tangs 110a, 110b, and 110c serve to receive and engage an armored cable inserted from the inbound end of the housing (not shown in FIG. 5) and guide the cable toward the cylindrical outbound end of the housing in a manner that separate cables are advanced to the outbound end without mutual interference.

Referring to FIG. 6, an end view of the inbound end 14 of the housing 12 of the preferred embodiment of FIG. 3, the spring steel cable retainers 20, 22 are shown locked into their respective inbound insert apertures 24, 26. As shown in FIG. 6, tangs 110a, 110b, and 110c are oriented to receive and engage an armored cable (not shown in FIG. 6) inserted from the inbound end 14 of the housing 12 and guide the cable toward the aperture 15 in the outbound end of the housing 12 in a manner that separate cables are advanced to the outbound end without mutual interference. The smooth interior surface 38 of the shoulder portions of the housing 12 also serve to guide the cables to the outbound end aperture 15. The orientation of the inwardly extending tangs 110a, 110b, 110c of the cable retainers 20, 22 are critical as cable retainer 22 on the right side of FIG. 6 guides its cable upward in the housing 12 and toward the outbound end aperture 15 while cable retainer 24 on the left side of FIG. 6 guides its cable downward in the housing 12 and toward the outbound end aperture 15. The net result is that separation is maintained between the cables allowing them to slip by one another and through the housing 12 to the outbound end aperture 15.

As the invention has been described, it will be apparent to those skilled in the art that the same may be varied in many ways without departing from the spirit and scope of the invention. Any and all such modifications are intended to be included within the scope of the appended claims.

What is claimed is:
1. A duplex electrical connector comprising:
   a) a housing having a cylindrical outbound end, a generally oval inbound end, and an interior channel linking said inbound and said outbound end;

b) a pair of parallel openings in said inbound end;

c) a tubular spring steel cable retainer secured in each of said openings in said inbound end for accepting separate cables, said retainers including a set of inwardly extending tangs to receive and engage said separate cables inserted from said inbound end and guide said separate cables toward said cylindrical outbound end in a manner that said separate cables are advanced to said outbound end, said inwardly extending tangs restricting removal of said separate cables by force applied on said separate cables from said inbound end; and d) a tubular spring steel adapter secured to said cylindrical outbound end of said housing, said adapter having outwardly extending tangs.

2. The duplex electrical connector of claim 1 including an insert secured within said inbound end, said insert is generally oval in shape and includes said pair of parallel openings, said openings having an insertion end, a rearward end, and interior walls with said retainers disposed in said openings, said walls each including a threaded hole and a screw disposed laterally therein so that tightening of said screws will secure said retainers in said openings.

3. The duplex electrical connector of claim 1 including an insert secured within said inbound end, said insert is generally oval in shape and includes said pair of parallel openings having an insertion end, a rearward end, and interior walls with said retainers disposed in said openings, said walls each including an annular ridge near said rearward end for securing said retainers in said openings.

4. The duplex electrical connector of claim 1 wherein said pair of parallel openings include interior walls, said walls including a plurality of tang accepting apertures, said retainers including a plurality of outward extending tangs that permit insertion of said retainers in a compressed state into said openings such that said tangs snap into said tang accepting apertures upon full insertion.

5. The duplex electrical connector of claim 1 wherein said inwardly extending tangs in each of said cable retainers consist of three tangs spaced approximately 90° apart such that said tangs cover approximately 180° of the opening through each of said retainers and the remaining 180° is essentially open and defines a cable passageway.

6. The duplex electrical connector of claim 5 wherein said generally oval inbound end contains two cable retainers centered along a central axis dissecting the oval lengthwise with the first of said retainers having said cable passageway oriented approximately 45° away from the center of said inbound end and the second of said retainers having said cable passageway oriented approximately 45° away from the center in the opposite direction of said first retainer.

* * * * *